United States Patent
Uchiyama et al.

(10) Patent No.: US 11,754,384 B2
(45) Date of Patent: Sep. 12, 2023

(54) METHOD FOR MEASURING AXIAL CLEARANCE OF BEARING DEVICE FOR VEHICLE WHEEL

(71) Applicant: NTN CORPORATION, Osaka (JP)

(72) Inventors: Nobukatsu Uchiyama, Shizuoka (JP); Satoshi Goto, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/765,523

(22) PCT Filed: Sep. 29, 2020

(86) PCT No.: PCT/JP2020/036881
§ 371 (c)(1),
(2) Date: Mar. 31, 2022

(87) PCT Pub. No.: WO2021/070676
PCT Pub. Date: Apr. 15, 2021

(65) Prior Publication Data
US 2022/0397381 A1      Dec. 15, 2022

(30) Foreign Application Priority Data
Oct. 8, 2019   (JP) .................................. 2019-185251

(51) Int. Cl.
*G01B 5/14*      (2006.01)
*G01B 3/22*      (2006.01)

(52) U.S. Cl.
CPC .............. *G01B 5/14* (2013.01); *G01B 3/22* (2013.01)

(58) Field of Classification Search
CPC . G01B 5/14; G01B 3/22; G01B 5/146; G01B 5/08; F16C 35/063; F16C 2226/52;
(Continued)

(56) References Cited

U.S. PATENT DOCUMENTS

| | | | |
|---|---|---|---|
| 5,620,263 A * | 4/1997 | Ohtsuki | ................ F16C 19/186 384/537 |
| 5,706,580 A * | 1/1998 | Ohtsuki | .................. F16C 43/04 384/537 |

(Continued)

FOREIGN PATENT DOCUMENTS

| | | |
|---|---|---|
| JP | 10-185717 | 7/1998 |
| JP | 2000-009562 | 1/2000 |

(Continued)

OTHER PUBLICATIONS

International Search Report dated Nov. 17, 2020 in International (PCT) Application No. PCT/JP2020/036881.

*Primary Examiner* — Yaritza Guadalupe-McCall
(74) *Attorney, Agent, or Firm* — Wenderoth, Lind & Ponack, L.L.P.

(57) ABSTRACT

The present invention addresses the problem of providing a method for measuring axial clearance of a wheel bearing device, with which it is possible to make a high-precision measurement of negative axial clearance. This method comprises: a step (S02) for press-fitting an inner race (4); a first negative axial clearance measurement step (S03); a swaging step (S04); an inner-race press-in amount measurement step (S05); a first inner-race outer-diameter increment measurement step (S06); a second inner-race outer-diameter increment calculation step (S07); an outer-diameter increment difference calculation step (S08); a first axial clearance decrement calculation step (S09); a second axial clearance decrement calculation step (S10); a third axial clearance decrement calculation step (S11); and a second negative axial clearance calculation step (S12).

2 Claims, 11 Drawing Sheets

(58) Field of Classification Search
CPC .............. F16C 2323/02; F16C 19/186; B60B 27/0078; B60B 27/0005
See application file for complete search history.

(56) References Cited

U.S. PATENT DOCUMENTS

| | | | | |
|---|---|---|---|---|
| 5,718,049 | A * | 2/1998 | Ohtsuki | F16C 35/063 384/537 |
| 6,070,325 | A * | 6/2000 | Miyata | F16C 43/04 384/537 |
| 6,257,078 | B1 * | 7/2001 | Vencill | G01M 13/045 33/517 |
| 6,491,440 | B1 * | 12/2002 | Sahashi | F16C 19/184 384/544 |
| 6,634,951 | B2 * | 10/2003 | Sahashi | F16D 3/2245 464/145 |
| 8,429,823 | B2 | 4/2013 | Miura et al. | |
| 11,193,534 | B2 * | 12/2021 | Bohnert | F16C 35/067 |
| 2001/0004611 | A1 * | 6/2001 | Sahashi | B60B 27/00 464/145 |
| 2010/0220950 | A1 | 9/2010 | Miura et al. | |
| 2015/0091368 | A1 * | 4/2015 | Morello | F16C 33/783 301/108.3 |
| 2021/0048065 | A1 * | 2/2021 | Bohnert | F16B 2/02 |
| 2022/0397381 | A1 * | 12/2022 | Uchiyama | F16C 35/063 |

FOREIGN PATENT DOCUMENTS

| | | |
|---|---|---|
| JP | 2006-342877 | 12/2006 |
| JP | 2018-021613 | 2/2018 |
| WO | 95/12072 | 5/1995 |
| WO | 2007/083688 | 7/2007 |

* cited by examiner

METHOD FOR MEASURING AXIAL CLEARANCE OF BEARING DEVICE FOR VEHICLE WHEEL

TECHNICAL FIELD

The present invention relates to a method for measuring axial clearance of bearing device for a vehicle wheel.

BACKGROUND ART

Conventionally, a bearing device for a vehicle wheel that rotatably supports a wheel in a suspension device of an automobile or the like is known. In such a bearing device for a vehicle wheel, a preload is applied between rolling elements constituting the bearing device and a bearing ring.

By applying a preload to the bearing device, rigidity of the bearing device can be increased, and vibration and noise can be suppressed. However, if a preload is excessively applied, it may cause an increase in the rotational torque and a decrease in the life. Therefore, it is important to confirm whether an appropriate preload is applied to the bearing device.

As a method of confirming the preload applied to the bearing device, for example, as disclosed in Patent Literature 1, in a rolling bearing in which a plurality of rolling elements are provided in a plurality of rows, a preload measurement method is known in which a negative clearance in the axial direction between a hub ring and an inner ring press-fitted into the hub ring is measured to measure the preload applied to the bearing.

As described above, in the case of measuring the negative clearance in the axial direction, since the negative clearance in the axial direction changes when the inner ring is pushed in the axial direction when the hub ring is swaged, the negative clearance in the axial direction is obtained on the basis of the press-in amount of the inner ring before and after the swaging of the hub ring.

CITATIONS LIST

Patent Literature

Patent Literature 1: JP-A H10-185717 Gazette

SUMMARY OF INVENTION

Technical Problems

However, as a result of intensive studies by the present applicant, it has been found that when the hub ring is swaged, the outer diameter of the inner ring increases and the outer diameter of the inner ring increases, so that the negative clearance in the axial direction is affected and fluctuates. As a result, it has been found that it is difficult to measure the negative clearance in the axial direction with high accuracy only by obtaining the change amount of the negative clearance in the axial direction before and after swaging of the hub ring on the basis of only the press-in amount of the inner ring.

Therefore, an object of the present invention is to provide A method for measuring axial clearance of a bearing device for a vehicle wheel capable of measuring a negative axial clearance in the bearing device for a vehicle wheel with high accuracy.

Solutions to Problems

That is, a first invention is a method for measuring axial clearance of a bearing device for a vehicle wheel which includes: an outer member having a plurality of rows of outer raceway surfaces on an inner periphery; an inner member including a hub ring having a small-diameter step portion axially extending on an outer periphery and an inner ring press-fitted into the small-diameter step portion of the hub ring, the inner member having a plurality of rows of inner raceway surfaces facing the plurality of rows of outer raceway surfaces; and a plurality of rows of rolling elements rollably accommodated between both raceway surfaces of the outer member and the inner member. The method includes: press-fitting the inner ring into the small-diameter step portion of the hub ring to a position where the inner ring abuts on the hub ring in an axial direction; measuring a first negative axial clearance between the inner ring and the hub ring after the press-fitting; swaging an inner-side end portion of the small-diameter step portion to the inner ring after the measuring of the first negative axial clearance; measuring an inner ring press-in amount that is a press-in amount of the inner ring in the axial direction from after the press-fitting to after the swaging; measuring a first inner ring outer diameter enlarged amount that is an enlarged amount of an outer diameter of the inner ring from after the press-fitting to after the swaging; calculating a second inner ring outer diameter enlarged amount from the inner ring press-in amount measured in the measuring of the inner ring press-in amount, and a relationship between the press-in amount of the inner ring in the axial direction and an outer-diameter enlarged amount of the inner ring; calculating an outer diameter enlarged amount difference which is a difference between the first inner ring outer diameter enlarged amount and the second inner ring outer diameter enlarged amount; calculating a first axial clearance reduced amount from the outer diameter enlarged diameter amount difference calculated in the calculating of the outer diameter enlarged diameter amount difference, and a relationship between an outer diameter enlarged amount of the inner ring and an axial clearance reduced amount that is a reduced amount of an axial clearance between the inner ring and the hub ring; calculating a second axial clearance reduced amount from the inner ring press-in amount, and a relationship between the press-in amount of the inner ring in the axial direction and an axial clearance reduced amount that is a reduced amount of an axial clearance between the inner ring and the hub ring; calculating a third axial clearance reduced amount by adding the first axial clearance reduced amount calculated in the calculating of the first axial clearance reduced amount to the second axial clearance reduced amount calculated in the calculating of the second axial clearance reduced amount; and calculating a second negative axial clearance by adding the third axial clearance reduced amount to the first negative axial clearance measured in the measuring of the first axial clearance.

Advantageous Effects of Invention

As effects of the present invention, the following effects are obtained.

That is, according to the first invention, it is possible to measure the negative axial clearance with high accuracy.

DESCRIPTION OF EMBODIMENT

[Bearing Device for Vehicle Wheel]

Hereinafter, a bearing device for a vehicle wheel 1, which is an embodiment of a bearing device for a vehicle wheel in which a method for measuring axial clearance according to the present invention is performed, will be described with reference to FIG. 1.

Figure 1:
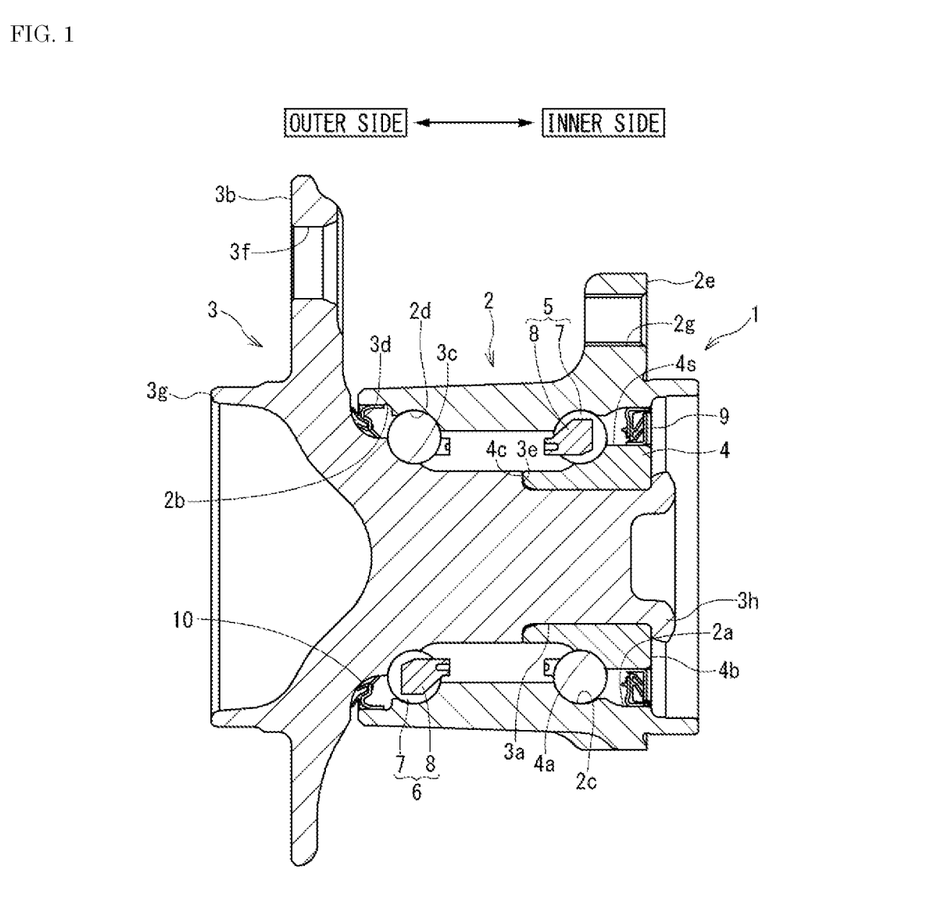
FIG. 1 is a side sectional view illustrating a bearing device for a vehicle wheel in which a method for measuring axial clearance is performed.

The bearing device for a vehicle wheel 1 illustrated in FIG. 1 rotatably supports a wheel in a suspension device of a vehicle such as an automobile. The bearing device for a vehicle wheel 1 has a configuration called a third generation, and includes an outer ring 2 that is an outer member, a hub ring 3 and an inner ring 4 that are inner members, two rows of an inner-side ball row 5 and an outer-side ball row 6 that are rolling rows, and an inner-side seal member 9 and an outer-side seal member 10. Here, the inner side represents the vehicle body side of the bearing device for a vehicle wheel 1 when attached to the vehicle body, and the outer side represents the wheel side of the bearing device for a vehicle wheel 1 when attached to the vehicle body. The axial direction represents a direction along the rotation axis of the bearing device for a vehicle wheel 1.

An inner-side opening 2a into which the inner-side seal member 9 can be fitted is formed at an inner-side end portion of the outer ring 2. An outer-side opening 2b into which the outer-side seal member 10 can be fitted is formed at the outer-side end of the outer ring 2. An inner-side outer raceway surface 2c and an outer-side outer raceway surface 2d are formed on the inner peripheral surface of the outer ring 2. A vehicle body mounting flange 2e for mounting the outer ring 2 to the vehicle body side member is integrally formed on the outer peripheral surface of the outer ring 2. The vehicle body mounting flange 2e is provided with a bolt hole 2g into which a fastening member (here, the bolt) for fastening the vehicle body side member and the outer ring 2 is inserted.

At the inner-side end portion of the hub ring 3, a small-diameter step portion 3a whose diameter is smaller than that of the outer-side end is formed on the outer peripheral surface. A shoulder portion 3e is formed at an outer-side end portion of the small-diameter step portion 3a of the hub ring 3. A wheel mounting flange 3b for mounting a wheel is integrally formed at an outer-side end portion of the hub ring 3. The wheel mounting flange 3b is provided with a bolt hole 3f into which a hub bolt for fastening the hub ring 3 and the wheel or the brake component is press-fitted.

The hub ring 3 is provided with an outer-side inner raceway surface 3c so as to face the outer-side outer raceway surface 2d of the outer ring 2. A lip sliding surface 3d with which the outer-side seal member 10 comes into sliding contact is formed on the base side of the wheel mounting flange 3b of the hub ring 3. The outer-side seal member 10 is fitted to an outer-side opening end of an annular space formed by the outer ring 2 and the hub ring 3. The hub ring 3 has an outer-side end surface 3g at an end portion on the outer side of the wheel mounting flange 3b.

The inner ring 4 is provided on the small-diameter step portion 3a of the hub ring 3. The inner ring 4 is fixed to the small-diameter step portion 3a of the hub ring 3 by press-fitting and swaging. The inner ring 4 applies preload to the inner-side ball row 5 and the outer-side ball row 6 which are rolling rows. The inner ring 4 has an inner-side end surface 4b at the inner-side end portion, and an outer-side end surface 4c at the outer-side end portion. A swaging portion 3h swaged to the inner-side end surface 4b of the inner ring 4 is formed at the inner-side end portion of the hub ring 3.

On the inner side of the hub ring 3, an inner raceway surface 4a is formed on the outer peripheral surface of the inner ring 4. The inner raceway surface 4a faces the inner-side outer raceway surface 2c of the outer ring 2.

The inner-side ball row 5 and the outer-side ball row 6, which are rolling rows, are configured by holding a plurality of balls 7, which are rolling elements, by a cage 8. The inner-side ball row 5 is rollably sandwiched between the inner raceway surface 4a of the inner ring 4 and the inner-side outer raceway surface 2c of the outer ring 2. The outer-side ball row 6 is rollably sandwiched between the inner raceway surface 3c of the hub ring 3 and the outer-side outer raceway surface 2d of the outer ring 2.

In the bearing device for a vehicle wheel 1, the outer ring 2, the hub ring 3 and the inner ring 4, the inner-side ball row 5, and the outer-side ball row 6 constitute a plurality of rows of angular ball bearings. The bearing device for a vehicle wheel 1 may be configured by a plurality of rows of tapered roller bearings.

[Method for Measuring Axial Clearance]

Figure 2:
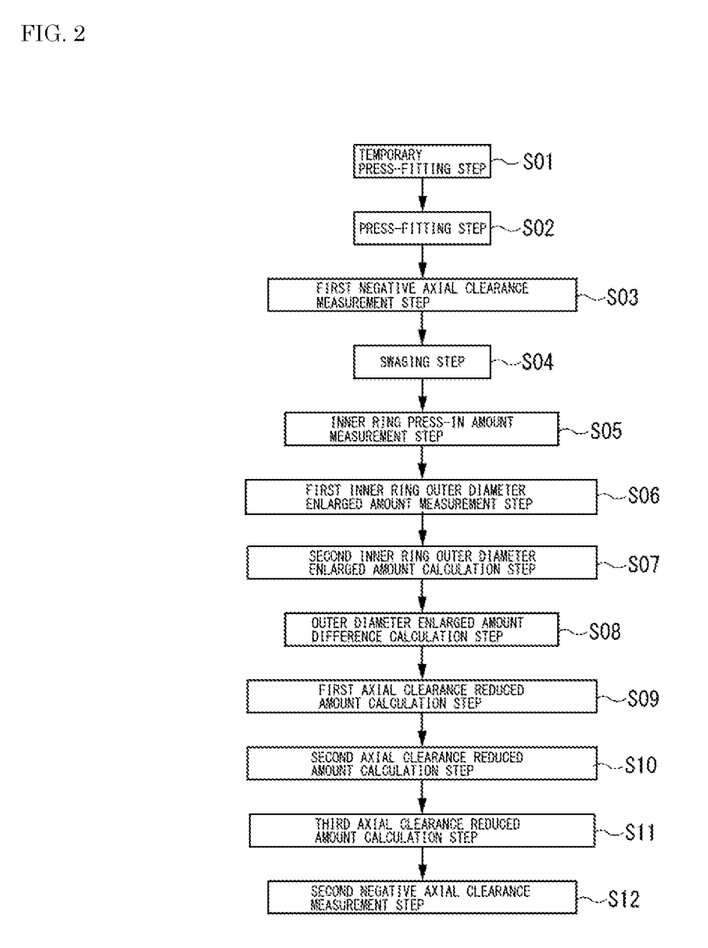
FIG. 2 is a diagram illustrating a flow of the method for measuring axial clearance.

Next, A method for measuring axial clearance of the bearing device for a vehicle wheel 1 will be described. As illustrated in FIG. 2, the method for measuring axial clearance in the present embodiment includes a temporary press-fitting step (S01), a press-fitting step (S02), a first negative axial clearance measurement step (S03), a swaging step (S04), an inner ring press-in amount measurement step (S05), a first inner ring outer diameter enlarged amount measurement step (S06), a second inner ring outer diameter enlarged amount calculation step (S07), an outer diameter enlarged amount difference calculation step (S08), a first axial clearance reduced amount calculation step (S09), a second axial clearance reduced amount calculation step (S10), a third axial clearance reduced amount calculation step (S11), and a second negative axial clearance measurement step (S12). Each step of the method for measuring axial clearance will be described below.

(Temporary Press-Fitting Step)

Figure 3:
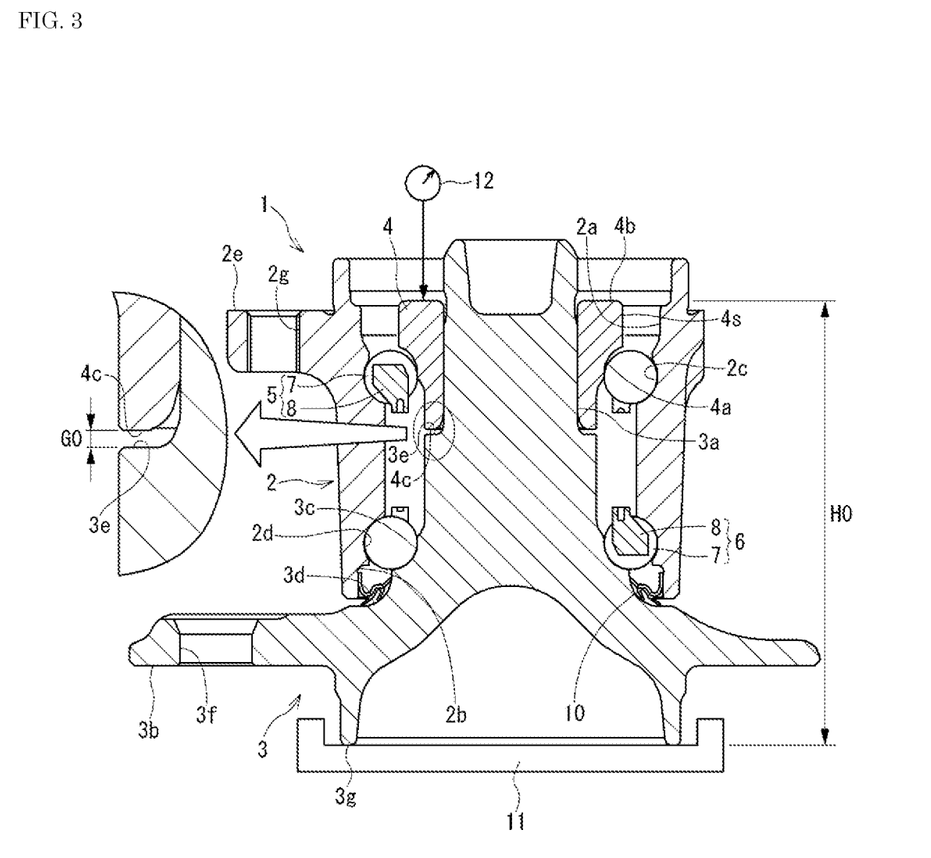
FIG. 3 is a side sectional view illustrating the bearing device for a vehicle wheel in a state where an inner ring is temporarily press-fitted into a small-diameter step portion of a hub ring.

As illustrated in FIG. 3, the hub ring 3 is placed on a support base 11 in a posture in which the axial direction is the vertical direction and the outer-side end surface 3g is positioned downward. The outer-side end surface 3g of the hub ring 3 is grounded to the support base 11. The outer ring 2 is rotatably mounted on the hub ring 3 placed on the support base 11 via the inner-side ball row 5 and the outer-side ball row 6. An outer-side seal member 10 is fitted to an outer-side end of the outer ring 2. Grease is filled between the hub ring 3 and the outer ring 2.

In the temporary press-fitting step (S01), the inner ring 4 is temporarily press-fitted into the small-diameter step portion 3a of the hub ring 3 placed on the support base 11. The temporary press-fitting of the inner ring 4 is performed by press-fitting the inner ring 4 into the small-diameter step portion 3a from above and stopping the press-fitting immediately before the outer-side end surface 4c of the inner ring 4 comes into contact with the shoulder portion 3e of the hub ring 3. Here, the press-fitting work of the inner ring 4 is performed in a state where a predetermined pressure is applied using a pushing device such as a hydraulic cylinder or an air cylinder, for example. When the temporary press-fitting of the inner ring 4 is completed, a positive axial clearance G0 exists between the outer-side end surface 4c of the inner ring 4 and the shoulder portion 3e of the hub ring 3. The positive axial clearance G0 can be set in advance before the inner ring 4 is temporarily press-fitted using the pushing device.

In the temporary press-fitting step (S01), the positive axial clearance G0 and an axial dimension H0 between the outer-side end surface 3g of the hub ring 3 and the inner-side end surface 4b of the inner ring 4 after the temporary press-fitting of the inner ring 4 are measured. The axial dimension H0 can be measured by a measuring instrument 12 such as a dial gauge.

(Press-Fitting Step)

Figure 4:
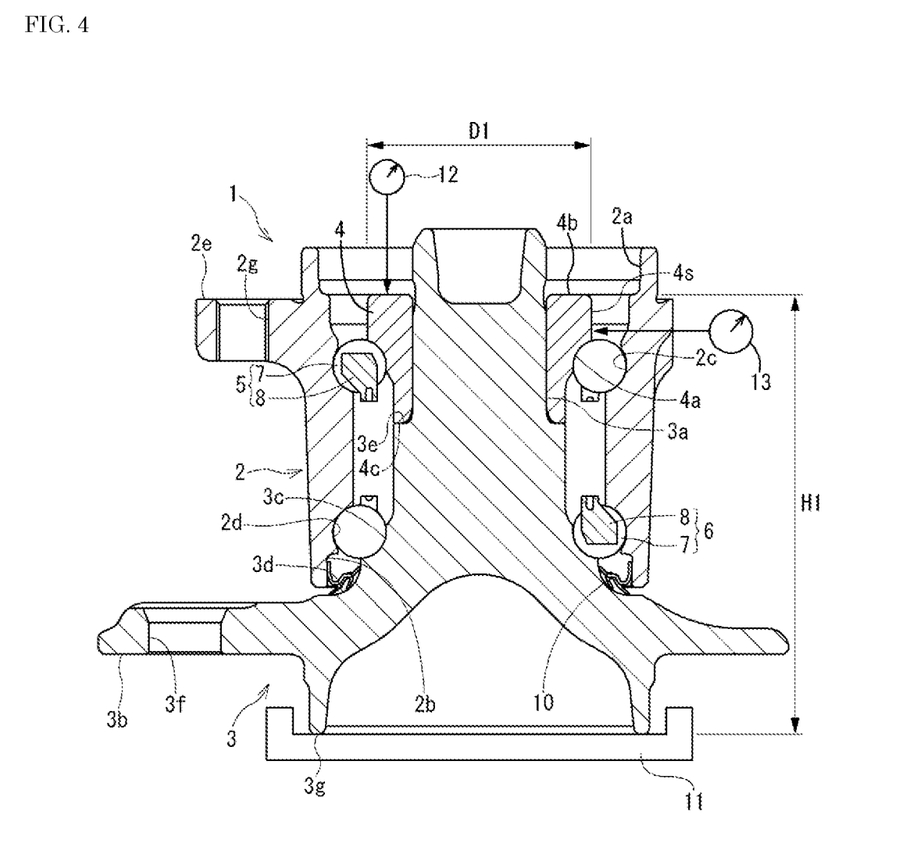
FIG. 4 is a side sectional view illustrating the bearing device for a vehicle wheel in a state where the inner ring is press-fitted into the small-diameter step portion of the hub ring.

After the temporary press-fitting step (S01), the press-fitting step (S02) is performed. As illustrated in FIG. 4, in the press-fitting step (S02), the inner ring 4 is press-fitted into the small-diameter step portion 3a until the outer-side end surface 4c of the inner ring 4 comes into contact with the shoulder portion 3e of the hub ring 3. After the press-fitting of the inner ring 4 into the small-diameter step portion 3a is completed, an axial dimension H1 between the outer-side end surface 3g of the hub ring 3 and the inner-side end surface 4b of the inner ring 4 after the press-fitting of the inner ring 4 is measured by the measuring instrument 12. Further, after the press-fitting of the inner ring 4 into the small-diameter step portion 3a is completed, an outer diameter dimension D1 of the inner ring 4 is measured by a measuring instrument 13.

(First Negative Axial Clearance Measurement Step)

After the press-fitting step (S02), the first negative axial clearance measurement step (S03) is performed. In the first negative axial clearance measurement step (S03), a value obtained by subtracting the axial dimension H1 from the axial dimension H0 is subtracted from the positive axial clearance G0 to obtain a first negative axial clearance G1 between the inner ring 4 and the hub ring 3 after the press-fitting of the inner ring 4 (G1=G0−(H0−H1)).

(Swaging Step)

Figure 5:
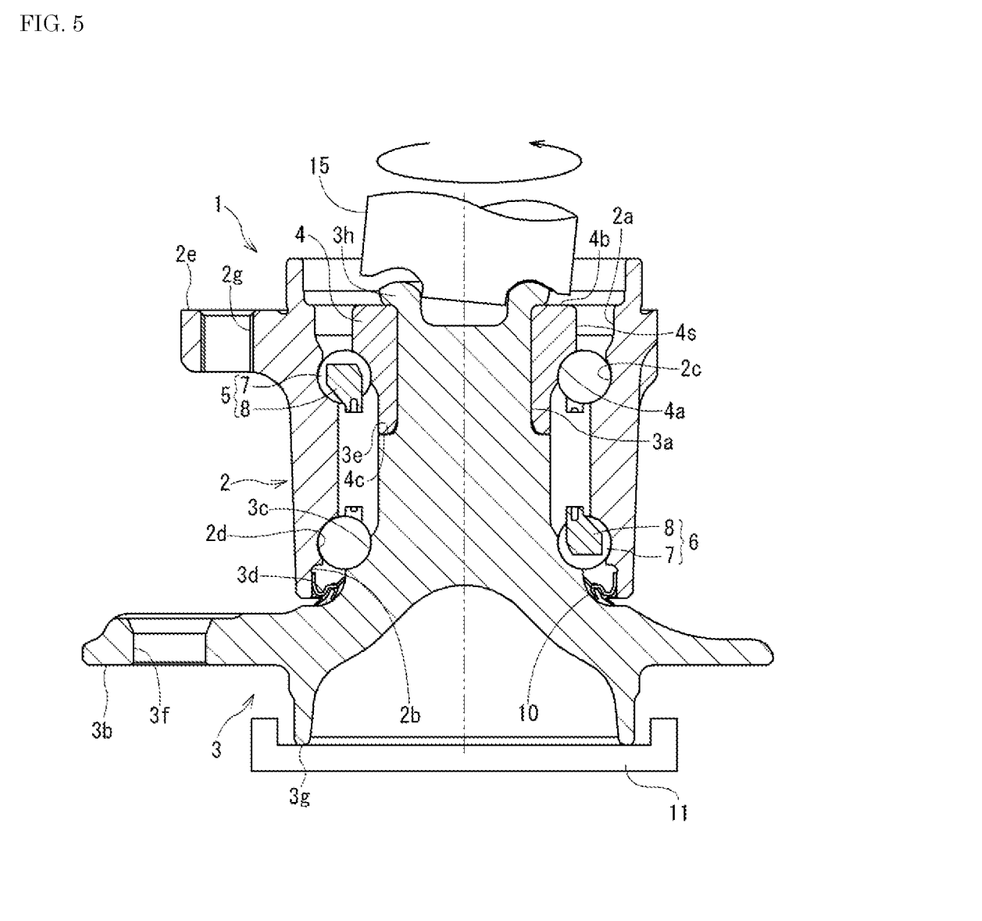
FIG. 5 is a side sectional view illustrating the bearing device for a vehicle wheel in a state where the hub ring is swaged to the inner ring.

The swaging step (S04) is performed after the first negative axial clearance measurement step (S03). As illustrated in FIG. 5, in the swaging step (S04), the inner-side end portion of the small-diameter step portion 3a of the hub ring 3 is swaged to the inner-side end surface 4b of the inner ring 4 by a swaging tool 15. The swaging can be performed, for example, by swinging swaging.

Figure 6A:
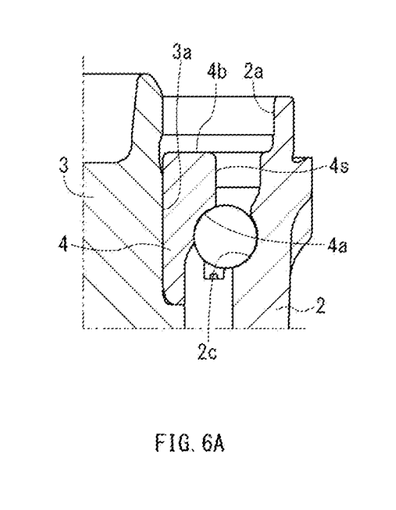
FIGS. 6A-6C are side sectional views illustrating a state in which the outer diameter of the inner ring expands when the hub ring is swaged to the inner ring.
Figure 6B:
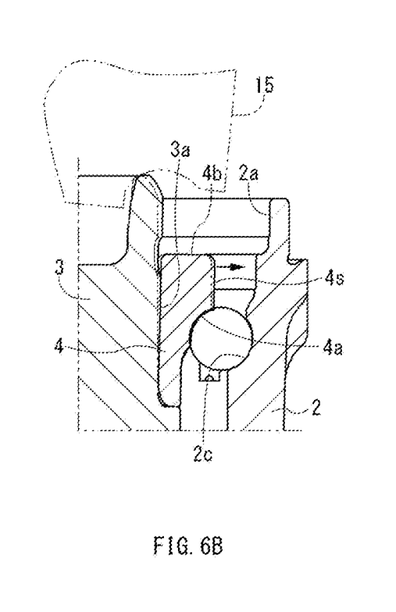

In the case of performing the swaging processing, when the swaging processing is started by bringing the swaging tool 15 into contact with the inner-side end portion of the small-diameter step portion 3a from the state before starting the swaging processing illustrated in FIG. 6A, the small-diameter step portion 3a is pushed and expanded toward the outer diameter side by the swaging tool 15 as illustrated in FIG. 6B. Further, an outer peripheral surface 4s of the inner ring 4 press-fitted into the small-diameter step portion 3a is enlarged toward the outer diameter side by the small-diameter step portion 3a.

Figure 6C:
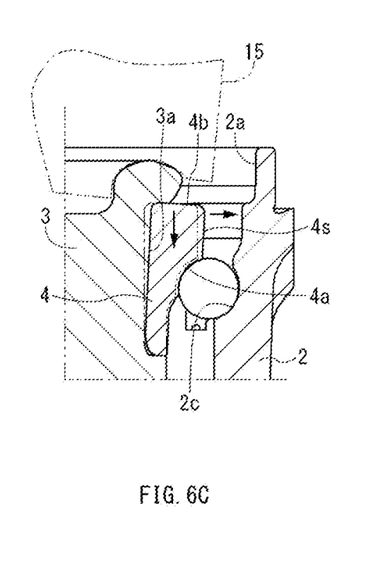

Thereafter, when the small-diameter step portion 3a is swaged by the swaging tool 15, as illustrated in FIG. 6C, the inner ring 4 is pushed into the outer side in the axial direction and is further expanded toward the outer diameter side. That is, by performing the swaging processing, the inner ring 4 is pushed in the axial direction by a predetermined press-in amount and is expanded toward the outer diameter side by a predetermined diameter enlarged amount. As described above, when the diameter of the inner ring 4 is expanded by the swaging processing of the hub ring 3, even if the press-in amount of the inner ring 4 in the axial direction is the same, the negative axial clearance between the inner ring 4 and the hub ring 3 fluctuates according to the diameter enlarged amount of the inner ring 4.

Figure 7:
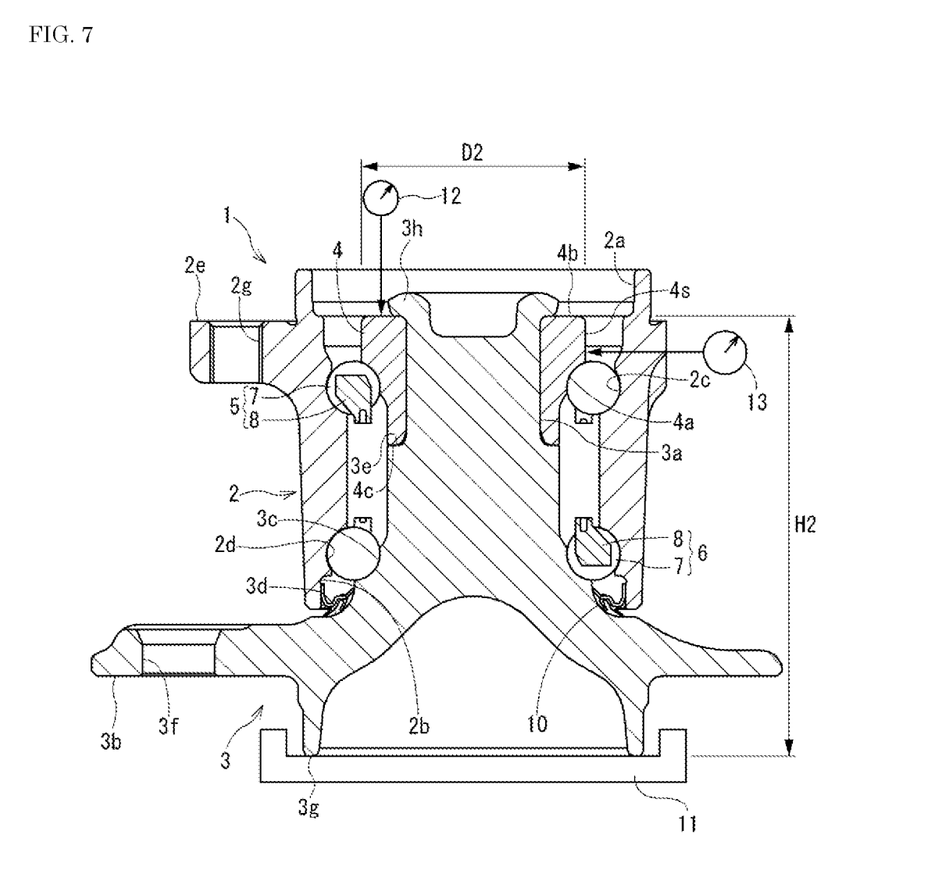
FIG. 7 is a side sectional view illustrating the bearing device for a vehicle wheel in a state where the hub ring is swaged to the inner ring.

As illustrated in FIG. 7, in the swaging step (S04), after completion of the swaging processing on the inner ring 4 of the small-diameter step portion 3a, an axial dimension H2 between the outer-side end surface 3g of the hub ring 3 and the inner-side end surface 4b of the inner ring 4 after completion of the swaging processing is measured by a measuring instrument 12. An outer diameter dimension D2 of the inner ring 4 after completion of the swaging processing is measured by the measuring instrument 13.

(Inner Ring Press-In Amount Measurement Step)

The inner ring press-in amount measurement step (S05) is performed after the swaging step (S04). In the inner ring press-in amount measurement step (S05), a press-in amount L in the axial direction of the inner ring 4 from after the press-fitting step (S02) in which the press-fitting of the inner ring 4 is completed to after the swaging step (S04) in which the swaging processing of the small-diameter step portion 3a is completed is measured. Specifically, the press-in amount L is obtained by subtracting the axial dimension H2 measured in the swaging step (S04) from the axial dimension H1 measured in the press-fitting step (S02) (L=H1−H2).

Figure 8:
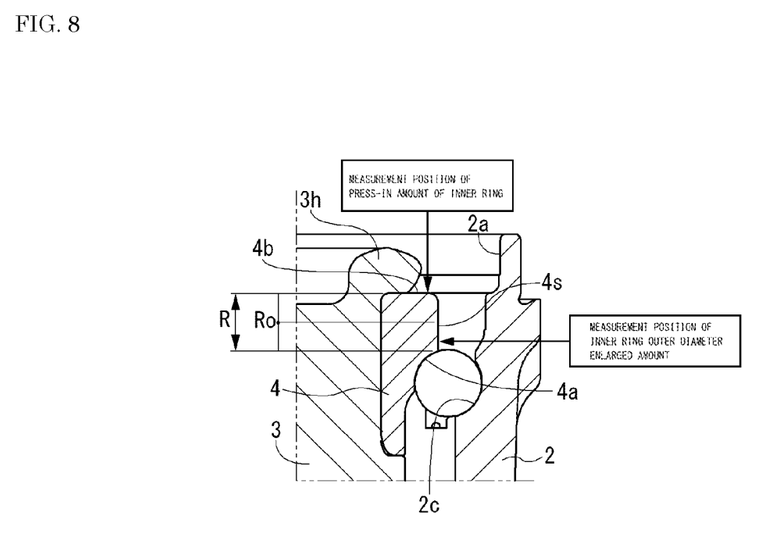
FIG. 8 is a side sectional view illustrating a measurement position of an inner ring press-in amount and a measurement position of an inner ring outer diameter enlarged amount.

In this case, the axial dimensions H1 and H2 are measured by bringing the contactor of the measuring instrument 12 into contact with the inner-side end surface 4b of the inner ring 4, and as illustrated in FIG. 8, the measurement position of the press-in amount L of the inner ring 4 is the inner-side end surface 4b of the inner ring 4.

(First Inner Ring Outer Diameter Enlarged Amount Measurement Step)

After the inner ring press-in amount measurement step (S05), the first inner ring outer diameter enlarged amount measurement step (S06) is performed. In the first inner ring outer diameter enlarged amount measurement step (S06), a first inner ring outer diameter enlarged amount DE1, which is the diameter enlarged amount of the outer diameter of the inner ring 4 from the press-fitting step (S02) to the swaging step (S04), is measured. Specifically, the inner ring outer diameter enlarged amount DE1 is obtained by subtracting the outer diameter dimension D1 measured in the press-fitting step (S02) from the outer diameter dimension D2 measured in the swaging step (S04) (DE1=D2−D1).

In this case, the outer diameter dimensions D1 and D2 are measured by bringing the contactor of the measuring instrument 13 into contact with the outer peripheral surface 4s of the inner ring 4, and as illustrated in FIG. 8, the measurement position of the first inner ring outer diameter enlarged amount DE1 is the outer peripheral surface 4s of the inner ring 4.

In the present embodiment, in particular, the first inner ring outer diameter enlarged amount DE1 is measured at a position closer to the inner raceway surface 4a than the inner-side end surface 4b in the outer peripheral surface 4s between the inner-side end surface 4b and the inner raceway surface 4a in the axial direction of the inner ring 4. Specifically, in a range R between the inner-side end surface 4b and the inner raceway surface 4a in the axial direction of the outer peripheral surface 4s, a portion located closer to the inner raceway surface 4a than an axial intermediate point Ro is defined as a measurement point of the first inner ring outer diameter enlarged amount DE1.

(Second Inner Ring Outer Diameter Enlarged Amount Calculation Step)

The second inner ring outer diameter enlarged amount calculation step (S07) is performed after the inner ring outer diameter enlarged amount measurement step (S06). In the second inner ring outer diameter enlarged amount calculation step (S07), a second inner ring outer diameter enlarged amount DE2 is calculated from the inner ring press-in amount L measured in the inner ring press-in amount measurement step (S05), and the relationship between the inner ring press-in amount, which is the press-in amount of the inner ring 4 in the axial direction illustrated in FIG. 9, and the inner ring outer diameter enlarged amount, which is the outer-diameter enlarged amount of the inner ring 4. Specifically, the second inner ring outer diameter enlarged amount DE2 is calculated by applying the inner ring press-in amount L to the relationship between the inner ring press-in amount and the inner ring outer diameter enlarged amount illustrated in FIG. 9.

Figure 9:
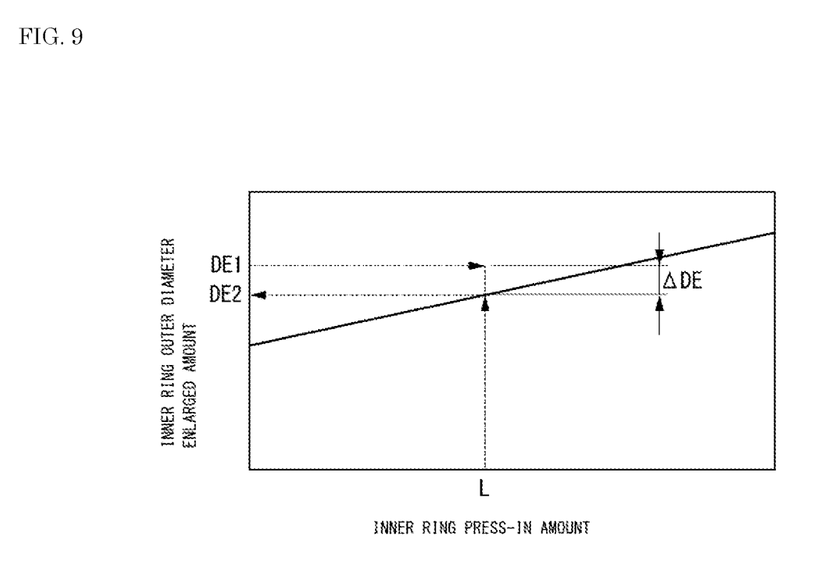
FIG. 9 is a diagram illustrating a relationship between the inner ring press-in amount and the inner ring outer diameter enlarged amount.

The relationship between the inner ring press-in amount and the inner ring outer diameter enlarged amount illustrated in FIG. 9 is obtained by actually measuring the inner ring press-in amount and the inner ring outer diameter enlarged amount for a predetermined sample of the bearing device for a vehicle wheel 1. The relationship between the inner ring press-in amount and the inner ring outer diameter enlarged amount can be obtained for each specification of the bearing device for a vehicle wheel 1.

(Outer Diameter Enlarged Amount Difference Calculation Step)

After the inner ring outer diameter enlarged amount calculation step (S07), the outer diameter enlarged amount difference calculation step (S08) is performed. In the outer diameter enlarged amount difference calculation step (S08), as illustrated in FIG. 9, an outer diameter enlarged amount difference ΔDE which is a difference between the first inner ring outer diameter enlarged amount DE1 measured in the inner ring outer diameter enlarged amount measurement step (S06) and the second inner ring outer diameter enlarged amount DE2 calculated in the inner ring outer diameter enlarged amount calculation step (S07) is calculated (ΔDE=DE2−DE1).

(First Axial Clearance Reduced Amount Calculation Step)

Figure 10:
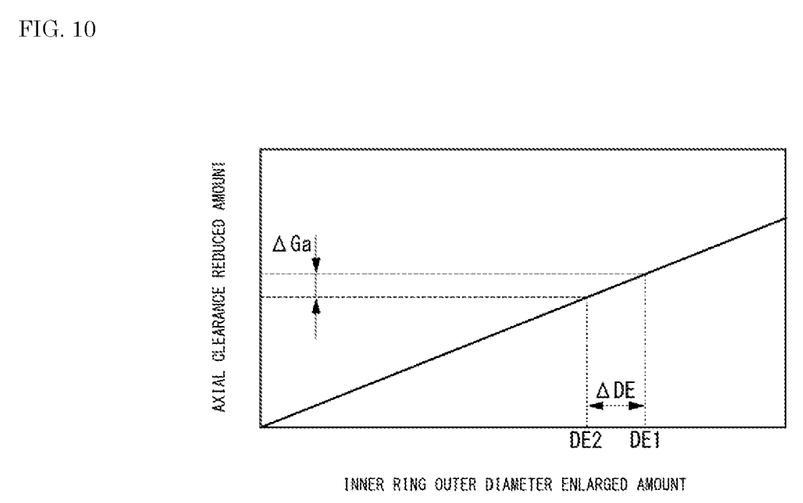
FIG. 10 is a diagram illustrating a relationship between the inner ring outer diameter enlarged amount and an axial clearance reduced amount.

After the outer diameter enlarged amount difference calculation step (S08), the first axial clearance reduced amount calculation step (S09) is performed. In the first axial clearance reduced amount calculation step (S09), as illustrated in FIG. 10, a first axial clearance reduced amount ΔGa is calculated from the outer diameter enlarged amount difference ΔDE calculated in the outer diameter enlarged amount difference calculation step (S08) and the relationship between the inner ring outer diameter enlarged amount which is the outer diameter enlarged amount of the inner ring 4, and the axial clearance reduced amount which is the reduced amount of the axial clearance between the inner ring 4 and the hub ring 3. Specifically, the first axial clearance reduced amount ΔGa is calculated by applying the outer diameter enlarged amount difference ΔDE to the relationship between the inner ring outer diameter enlarged amount and the inner ring outer diameter enlarged amount illustrated in FIG. 10.

That is, in the first axial clearance reduced amount calculation step (S09), the outer diameter enlarged amount difference ΔDE is converted into the first axial clearance reduced amount ΔGa using the relationship between the inner ring outer diameter enlarged amount and the axial clearance reduced amount illustrated in FIG. 10.

The relationship between the inner ring outer diameter enlarged amount and the axial clearance reduced amount illustrated in FIG. 10 is obtained by actually measuring the inner ring outer diameter enlarged amount and the axial clearance reduced amount for the same sample as the sample of the bearing device for a vehicle wheel 1 used for obtaining the relationship between the inner ring press-in amount and the inner ring outer diameter enlarged amount illustrated in FIG. 9. The relationship between the inner ring outer diameter enlarged amount and the axial clearance reduced amount can be obtained for each specification of the bearing device for a vehicle wheel 1.

(Second Axial Clearance Reduced Amount Calculation Step)

Figure 11:
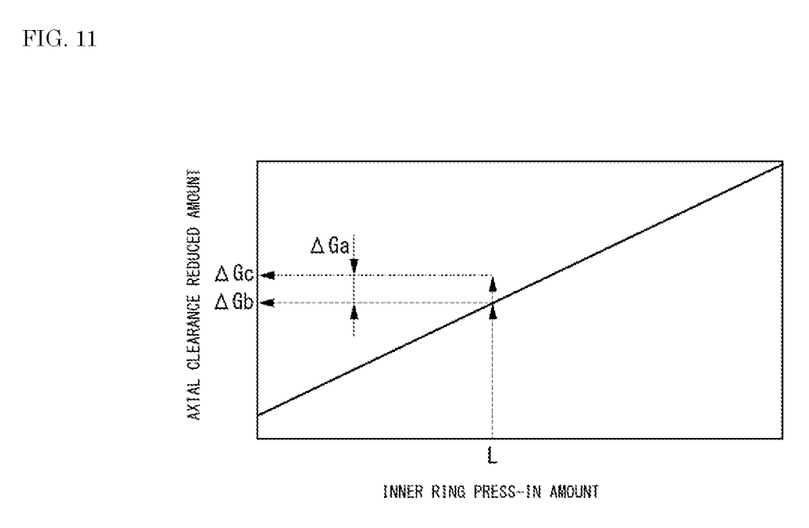
FIG. 11 is a diagram illustrating a relationship between the inner ring press-in amount and an axial clearance reduced amount.

After the first axial clearance reduced amount calculation step (S09), the second axial clearance reduced amount calculation step (S10) is performed. In the second axial clearance reduced amount calculation step (S10), as illustrated in FIG. 11, a second axial clearance reduced amount ΔGb is calculated from the inner ring press-in amount L measured in the inner ring press-in amount measurement step (S05) and the relationship between the inner ring press-in amount which is the press-in amount of the inner ring 4 in the axial direction, and the axial clearance reduced amount which is the reduced amount of the axial clearance between the inner ring 4 and the hub ring 3. Specifically, the second axial clearance reduced amount ΔGb is calculated by applying the inner ring press-in amount L to the relationship between the inner ring press-in amount and the axial clearance reduced amount illustrated in FIG. 11.

The relationship between the inner ring press-in amount and the axial clearance reduced amount illustrated in FIG. 11 is obtained by actually measuring the inner ring press-in amount and the axial clearance reduced amount for the same sample as the sample of the bearing device for a vehicle wheel 1 used for obtaining the relationship between the inner ring press-in amount and the inner ring outer diameter enlarged amount illustrated in FIG. 9. The relationship between the inner ring press-in amount and the axial clearance reduced amount can be obtained for each specification of the bearing device for a vehicle wheel 1.

(Third Axial Clearance Reduced Amount Calculation Step)

After the second axial clearance reduced amount calculation step (S10), the third axial clearance reduced amount calculation step (S11) is performed. In the third axial clearance reduced amount calculation step (S11), as illustrated in FIG. 11, a third axial clearance reduced amount ΔGc is calculated by adding the first axial clearance reduced amount ΔGa calculated in the first axial clearance reduced amount calculation step (S09) to the second axial clearance reduced amount ΔGb calculated in the second axial clearance reduced amount calculation step (S10) (ΔGc=ΔGb+ΔGa).

That is, in the third axial clearance reduced amount calculation step (S11), the third axial clearance reduced amount ΔGc is obtained by correcting the second axial clearance reduced amount ΔGb corresponding to the inner ring press-in amount L measured in the inner ring press-in amount measurement step (S05) using the first axial clearance reduced amount ΔGa corresponding to the outer diameter enlarged amount difference ΔDE.

(Second Negative Axial Clearance Calculation Step)

After the third axial clearance reduced amount calculation step (S11), the second negative axial clearance calculation step (S12) is performed. In the second negative axial clearance calculation step (S12), a second negative axial clearance G2 is calculated by adding the third axial clearance reduced amount ΔGc to the first negative axial clearance G1 measured in the first negative axial clearance measurement step (S03).

In the method for measuring axial clearance, the second negative axial clearance G2 calculated in the second negative axial clearance calculation step (S12) is used as a measurement result of the negative axial clearance between the inner ring 4 and the hub ring 3 after the swaging processing of the bearing device for a vehicle wheel 1.

The second negative axial clearance G2, which is a measurement result in the method for measuring axial clearance, is obtained based on the press-in amount of the inner ring 4 before and after the swaging processing and the outer diameter enlarged amount of the inner ring 4 when the hub ring is swaged.

The negative axial clearance of the bearing device for a vehicle wheel 1 fluctuates under the influence of the outer diameter of the inner ring 4 expanded when the hub ring 3 is swaged, but the second negative axial clearance G2 measured in the method for measuring axial clearance is a measurement value in consideration of the outer diameter enlarged amount of the inner ring 4 in addition to the press-in amount of the inner ring 4.

Therefore, in the method for measuring axial clearance, the second negative axial clearance G2 can be measured with higher accuracy than a case where the second negative axial clearance G2 is obtained based only on the press-in amount of the inner ring 4.

In the method for measuring axial clearance, as described above, the first inner ring outer diameter enlarged amount DE1 is measured at a position closer to the inner raceway surface 4a that generates the negative axial clearance than the inner-side end surface 4b in the outer peripheral surface 4s between the inner-side end surface 4b and the inner raceway surface 4a in the axial direction of the inner ring 4. Therefore, the press-in amount of the inner ring 4 can be corrected with high accuracy using the outer diameter enlarged amount of the inner ring 4, and the negative axial clearance of the bearing device for a vehicle wheel 1 can be measured with higher accuracy.

Although the bearing device for a vehicle wheel 1 for a driven wheel has been described in the present embodiment, the present method for measuring axial clearance can also be applied to a bearing device for a vehicle wheel for a drive wheel having a specification of swaging a hub ring.

Although the embodiment of the present invention has been described above, the present invention is not limited to such an embodiment in any way, and is merely an example, and it is needless to say that the present invention can be implemented in various forms without departing from the gist of the present invention. The scope of the present invention is indicated by the description of the claims, and further includes the equivalent meaning and all changes within the scope of the claims.

INDUSTRIAL APPLICABILITY

The present invention is applicable to A method for measuring axial clearance of a bearing device for a vehicle wheel.

REFERENCE SIGNS LIST 1 bearing device for vehicle wheel
2 outer ring
2c (inner-side) outer raceway surface
2d (outer-side) outer raceway surface
3 hub ring
3a small-diameter step portion
3c inner raceway surface
4 inner ring
4a inner raceway surface
5 inner-side ball row
6 outer-side ball row
7 ball
DE1 first inner ring outer diameter enlarged amount
DE2 second inner ring outer diameter enlarged amount
G1 first negative axial clearance
G2 second negative axial clearance
L inner ring press-in amount
S02 press-fitting step
S03 first negative axial clearance measurement step
S04 swaging step
S05 inner ring press-in amount measurement step
S06 first inner ring outer diameter enlarged amount measurement step
S07 second inner ring outer diameter enlarged amount calculation step
S08 outer diameter enlarged amount difference calculation step
S09 first axial clearance reduced amount calculation step
S10 second axial clearance reduced amount calculation step
S11 third axial clearance reduced amount calculation step
S12 second negative axial clearance calculation step
ΔDE outer diameter enlarged amount difference
ΔGa first axial clearance reduced amount
ΔGb second axial clearance reduced amount
ΔGc third axial clearance reduced amount

The invention claimed is:

1. A method for measuring axial clearance of a bearing device for a vehicle wheel which includes:
an outer member having a plurality of rows of outer raceway surfaces on an inner periphery;
an inner member including a hub ring having a small-diameter step portion axially extending on an outer periphery and an inner ring press-fitted into the small-diameter step portion of the hub ring, the inner member having a plurality of rows of inner raceway surfaces facing the plurality of rows of outer raceway surfaces; and a plurality of rows of rolling elements rollably accommodated between both raceway surfaces of the outer member and the inner member, the method comprising:

press-fitting the inner ring into the small-diameter step portion of the hub ring to a position where the inner ring abuts on the hub ring in an axial direction;

measuring a first negative axial clearance between the inner ring and the hub ring after the press-fitting;

swaging an inner-side end portion of the small-diameter step portion to the inner ring after the measuring of the first negative axial clearance;

measuring an inner ring press-in amount that is a press-in amount of the inner ring in the axial direction from after the press-fitting to after the swaging;

measuring a first inner ring outer diameter enlarged amount that is an enlarged amount of an outer diameter of the inner ring from after the press-fitting to after the swaging;

calculating a second inner ring outer diameter enlarged amount from the inner ring press-in amount measured in the measuring of the inner ring press-in amount, and a relationship between the press-in amount of the inner ring in the axial direction and an outer-diameter enlarged amount of the inner ring;

calculating an outer diameter enlarged amount difference which is a difference between the first inner ring outer diameter enlarged amount and the second inner ring outer diameter enlarged amount;

calculating a first axial clearance reduced amount from the outer diameter enlarged diameter amount difference calculated in the calculating of the outer diameter enlarged diameter amount difference, and a relationship between an outer diameter enlarged amount of the inner ring and an axial clearance reduced amount that is a reduced amount of an axial clearance between the inner ring and the hub ring;

calculating a second axial clearance reduced amount from the inner ring press-in amount, and a relationship between the press-in amount of the inner ring in the axial direction and an axial clearance reduced amount that is a reduced amount of an axial clearance between the inner ring and the hub ring;

calculating a third axial clearance reduced amount by adding the first axial clearance reduced amount calculated in the calculating of the first axial clearance reduced amount to the second axial clearance reduced amount calculated in the calculating of the second axial clearance reduced amount; and calculating a second negative axial clearance by adding the third axial clearance reduced amount to the first negative axial clearance measured in the measuring of the first axial clearance.

2. The method for measuring axial clearance of a bearing device for a vehicle wheel according to claim 1, wherein in the measuring of the first inner ring outer diameter enlarged amount, the first inner ring outer diameter enlarged amount is measured at a position closer to the inner raceway surface than an inner-side end surface in an outer peripheral surface between the inner-side end surface and the inner raceway surface in the axial direction of the inner ring.

\* \* \* \* \*